US011493719B2

(12) United States Patent
Marcouiller

(10) Patent No.: US 11,493,719 B2
(45) Date of Patent: Nov. 8, 2022

(54) INDEXING TERMINAL ARRANGEMENT

(71) Applicant: CommScope Technologies LLC, Hickory, NC (US)

(72) Inventor: Thomas Marcouiller, Shakopee, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/895,141

(22) Filed: Jun. 8, 2020

(65) Prior Publication Data

US 2020/0371307 A1    Nov. 26, 2020

Related U.S. Application Data

(63) Continuation of application No. 16/433,237, filed on Jun. 6, 2019, now Pat. No. 10,678,013, which is a
(Continued)

(51) Int. Cl.
| | | |
|---|---|---|
| *G02B 6/44* | (2006.01) | |
| *G02B 6/28* | (2006.01) | |
| *G02B 6/255* | (2006.01) | |
| *G02B 6/38* | (2006.01) | |
| *G02B 6/40* | (2006.01) | |

(52) U.S. Cl.
CPC ......... *G02B 6/4472* (2013.01); *G02B 6/2551* (2013.01); *G02B 6/2804* (2013.01); *G02B 6/3825* (2013.01); *G02B 6/3846* (2013.01); *G02B 6/3885* (2013.01);
(Continued)

(58) Field of Classification Search
CPC .. G02B 6/4472; G02B 6/2551; G02B 6/2804; G02B 6/4411; G02B 6/40
See application file for complete search history.

(56) References Cited

U.S. PATENT DOCUMENTS

| | | |
|---|---|---|
| 4,887,883 A | 12/1989 | Darbut et al. |
| 7,264,402 B2 | 9/2007 | Theuerkorn et al. |
| (Continued) | | |

FOREIGN PATENT DOCUMENTS

| | | |
|---|---|---|
| EP | 0 783 809 B1 | 11/1999 |
| EP | 1 981 185 B1 | 12/2013 |
| (Continued) | | |

OTHER PUBLICATIONS

International Search Report and Written Opinion of the International Searching Authority for corresponding International Patent Application No. PCT/US2016/019044 dated Jun. 8, 2016, 12 pages.

*Primary Examiner* — Sung H Pak
(74) *Attorney, Agent, or Firm* — Merchant & Gould P.C.

(57) ABSTRACT

An indexing terminal arrangement includes a terminal housing that receives an input cable; an optical power splitter disposed within the interior of the terminal housing; a first multi-fiber optical adapter coupled to the terminal housing; a first single-fiber optical adapter coupled to the terminal housing; and a pass-through multi-fiber optical adapter coupled to the terminal housing. Split optical signals are provided to the first multi-fiber optical adapter and the first single-fiber optical adapter. Unsplit and indexed optical signals are provided to the pass-through optical adapter.

20 Claims, 3 Drawing Sheets

Related U.S. Application Data continuation of application No. 15/553,360, filed as application No. PCT/US2016/019044 on Feb. 23, 2016, now Pat. No. 10,317,640.

(60) Provisional application No. 62/120,121, filed on Feb. 24, 2015.

(52) U.S. Cl.
CPC ............ G02B 6/3897 (2013.01); G02B 6/40 (2013.01); G02B 6/4441 (2013.01); G02B 6/4471 (2013.01)

(56) References Cited

U.S. PATENT DOCUMENTS

| | | | |
|---|---|---|---|
| 7,744,288 B2 | 6/2010 | Lu et al. | |
| 7,942,590 B2 | 5/2011 | Lu et al. | |
| 8,755,688 B2 | 6/2014 | Vleugels et al. | |
| 9,207,421 B2 | 12/2015 | Conner | |
| 9,348,096 B2 | 5/2016 | Kmit et al. | |
| 9,557,498 B2 | 1/2017 | Loeffelholz | |
| 2010/0092129 A1* | 4/2010 | Conner | G02B 6/4452 385/17 |
| 2011/0129226 A1 | 6/2011 | Vleugels et al. | |
| 2012/0328294 A1 | 12/2012 | Chen | |
| 2013/0039623 A1 | 2/2013 | Zhang | |
| 2013/0216187 A1 | 8/2013 | Dowling | |
| 2014/0254986 A1 | 9/2014 | Kmit et al. | |
| 2015/0378112 A1 | 12/2015 | Marcouiller et al. | |

FOREIGN PATENT DOCUMENTS

| | | |
|---|---|---|
| JP | H10-32545 A | 2/1998 |
| WO | 2005/088373 A1 | 9/2005 |
| WO | 2006/050505 A1 | 5/2006 |
| WO | 2010/093794 A1 | 8/2010 |
| WO | 2013/149150 A1 | 10/2013 |
| WO | 2014/190281 A1 | 11/2014 |
| WO | 2014/195893 A1 | 12/2014 |
| WO | 2016/057411 A1 | 4/2016 |

* cited by examiner

INDEXING TERMINAL ARRANGEMENT

CROSS-REFERENCE TO RELATED APPLICATION

This application is a Continuation of U.S. patent application Ser. No. 16/433,237, filed on Jun. 6, 2019, now U.S. Pat. No. 10,678,013, which is a Continuation of U.S. patent application Ser. No. 15/553,360, filed on Aug. 24, 2017, now U.S. Pat. No. 10,317,640, which is a National Stage Application of PCT/US2016/019044, filed on Feb. 23, 2016, which claims the benefit of U.S. Patent Application Ser. No. 62/120,121, filed on Feb. 24, 2015, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Some aspects of the present disclosure are directed to an indexing terminal arrangement including a terminal housing configured to receive an input cable having multiple optical fibers; an optical power splitter disposed within the interior of the terminal housing; a first multi-fiber optical adapter coupled to the terminal housing; a first single-fiber optical adapter coupled to the terminal housing; a pass-through multi-fiber optical adapter coupled to the terminal housing; and a multi-fiber optical connector that is optically coupled to others of the optical fibers of the input cable. The optical power splitter is configured to optically couple to one of the optical fibers of the input cable. The optical power splitter is configured to split optical signals carried by the optical fiber of the input cable onto a plurality of splitter pigtails. The first multi-fiber optical adapter defines an interior port accessible from within the interior of the terminal housing and defines an exterior port accessible from the exterior of the terminal housing. Some of the splitter pigtails are optically coupled to the interior port of the first multi-fiber optical adapter. The first single-fiber optical adapter defines an interior port accessible from within the interior of the terminal housing and defines an exterior port accessible from an exterior of the terminal housing. Another of the splitter pigtails is optically coupled to the interior port of the first single-fiber optical adapter. The pass-through multi-fiber optical adapter defines an interior port accessible from within the interior of the terminal housing and defines an exterior port accessible from the exterior of the terminal housing. The multi-fiber optical connector is plugged into the interior port of the pass-through multi-fiber optical adapter. Optical lines are indexed between the others of the optical fibers of the input cable and fiber positions of the multi-fiber optical connector.

In certain implementations, multiple single-fiber optical adapters are coupled to the terminal housing including the first single-fiber optical adapter. Each of the splitter pigtails is separately routed to one of the single-fiber optical adapters.

In certain implementations, multiple multi-fiber optical adapters are coupled to the terminal housing including the first multi-fiber optical adapter. A first set of splitter pigtails are connectorized at a first multi-fiber connector that is plugged into a first of the multi-fiber optical adapters. A second set of splitter pigtails are connectorized at a second multi-fiber connector that is plugged into a second of the multi-fiber optical adapters.

In certain implementations, another single-fiber optical adapter is coupled to the terminal housing. An unsplit one of the optical fibers of the input cable is optically coupled to an interior port of the single-fiber optical adapter. The single-fiber optical adapter defines an unsplit output port accessible from the exterior of the terminal housing. In an example, the unsplit one of the optical fibers of the input cable is optically spliced to another optical fiber that is optically coupled to the single-fiber optical adapter that defines the unsplit output port.

In certain implementations, the multi-fiber optical connector terminates the others of the optical fibers of the input cable.

In certain implementations, stub fibers of the multi-fiber optical connector are mass fusion spliced to the others of the optical fibers of the input cable.

In certain implementations, a first optical coupler is disposed within the terminal housing. The first optical coupler has a first input/output, a second input/output, and a third input/output. The first input/output is optically coupled to the optical fiber of the input cable, the second input/output is optically coupled to the multi-fiber optical connector, and the third input/output is optically coupled to the optical power splitter. The third input/output receives any optical signals that are received at the first and second input/outputs.

In an example, the first optical coupler includes an optical power splitter. The first and second input/outputs of the first optical coupler are power splitter outputs and the third input/output of the first optical coupler is a power splitter input.

In certain examples, the single-fiber optical adapters include eight single-fiber optical adapters. In certain examples, the multi-fiber optical adapters include two multi-fiber optical adapters.

Other aspects of the present disclosure are directed to an indexing terminal arrangement including a terminal housing configured to receive an input cable having multiple optical fibers; an optical power splitter disposed within the interior of the terminal housing; a plurality of first hardened multi-fiber output ports disposed at the terminal housing and accessible from an exterior of the terminal housing; a plurality of hardened single-fiber output ports disposed at the terminal housing and accessible from an exterior of the terminal housing; and a multi-fiber pass-through port disposed at the terminal housing and accessible from an exterior of the terminal housing. The optical power splitter is configured to optically couple to one of the optical fibers of the input cable. The optical power splitter is configured to split optical signals carried by the optical fiber of the input cable onto a plurality of splitter pigtails. Each of the first hardened multi-fiber output ports is configured to receive a connectorized end of a multi-fiber cable to align the connectorized end of the multi-fiber cable with a connectorized end of a plurality of the splitter pigtails. Each of the hardened single-fiber output ports is configured to receive a connectorized end of a single-fiber cable to align the connectorized end of the hardened single-fiber cable with a connectorized end of a respective one of the splitter pigtails. The multi-fiber pass-through port is configured to receive a connectorized end of a multi-fiber pass-through cable to align the connectorized end of the multi-fiber pass-through cable with a multi-fiber connector that is optically coupled to unsplit optical fibers of the input cable, wherein a first sequential position of the multi-fiber connector defines an active optical line.

In some implementations, the optical fibers of the input cable enter the terminal housing and wherein the terminal housing includes a gasket for environmentally sealing against the input cable. In other implementations, a multi-fiber optical adapter is coupled to the terminal housing so that an exterior port is accessible from an exterior of the terminal housing. The exterior port is configured to sealingly and robustly receive a connectorized end of the input cable.

In certain implementations, another single-fiber output port disposed at the terminal housing and accessible from an exterior of the terminal housing. The single-fiber output port is configured to receive a connectorized end of a single-fiber cable that is aligned with a single-fiber optical connector that receives unsplit optical signals from one of the optical fibers of the input cable.

In certain implementations, the optical fibers of the input cable are optically spliced to other optical fibers within the terminal housing.

In certain implementations, the optical fibers of the input cable that are optically coupled to the multi-fiber connector are coupled using a mass-fusion splice.

In certain implementations, the terminal housing includes a top and a bottom that extending between a first end and a second end, the top and bottom also extend between a first side and a second side. The first hardened multi-fiber output ports and the hardened single-fiber output ports are disposed at the top of the terminal housing. In certain examples, the input cable is received at the first end of the terminal housing.

In certain implementations, the hardened multi-fiber output ports are configured to receive HMFOC connectors and the hardened single-fiber output ports are configured to receive DLX connectors.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
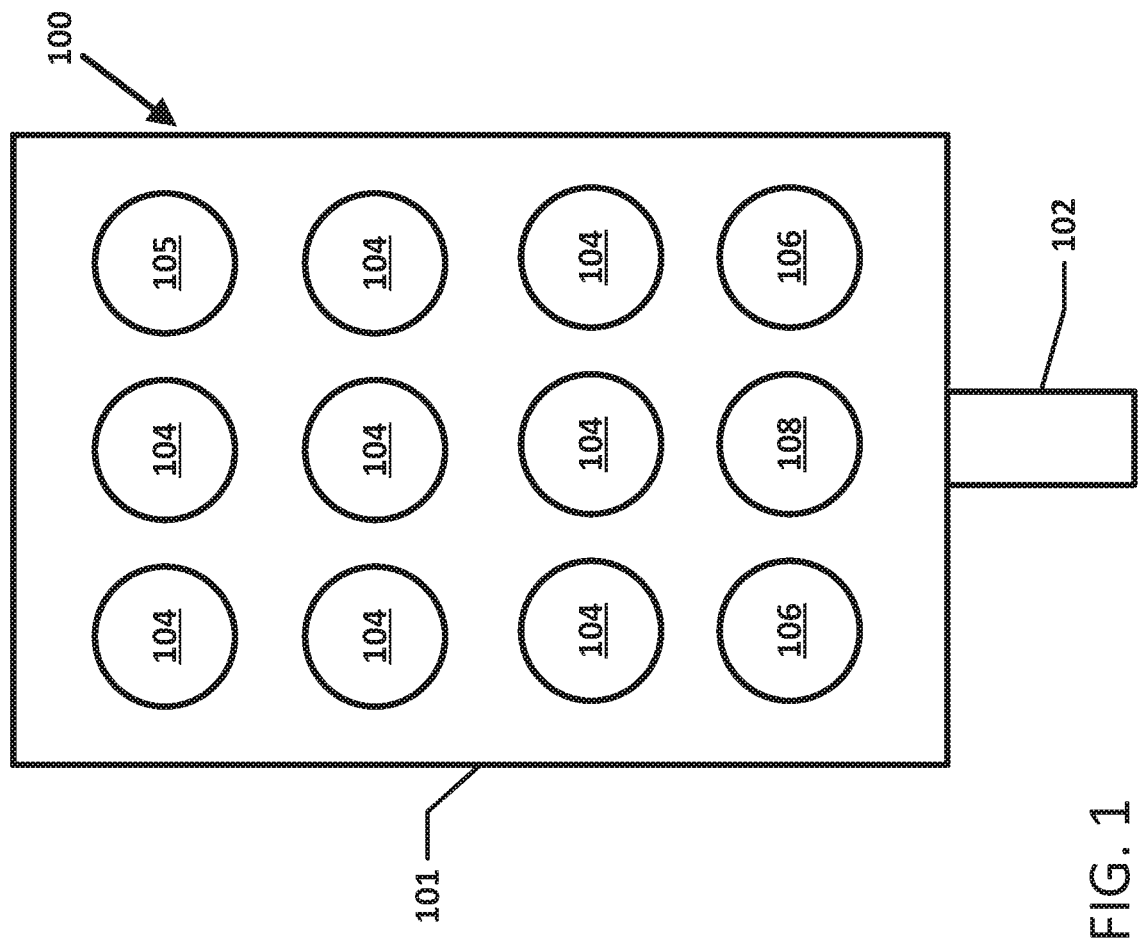
FIG. 1 is a block diagram showing an example indexing terminal arrangement that is configured to split and index optical lines received at the indexing terminal arrangement.

Reference will now be made in detail to exemplary aspects of the present disclosure that are illustrated in the accompanying drawings. Wherever possible, the same reference numbers will be used throughout the drawings to refer to the same or like parts.

The present disclosure relates generally to an indexing terminal arrangement 100 including an optical power splitter. The indexing terminal arrangement 100 includes a housing 101 that is configured to receive a multi-fiber input cable 102. In some implementations, the housing 101 includes a compression seal arrangement or other sealing mechanism to enable the input cable 102 to enter the housing 101. In other implementations, the housing 101 includes a hardened optical adapter having a ruggedized outer port at which the input cable 102 can be secured. As the term is used herein, a port is ruggedized if the port is environmentally sealed and enables a robust connection to an optical connected received thereat.

The indexing terminal housing 101 also defines a plurality of output ports at which various cables can be coupled. Each output port is defined by an optical adapter supported by the housing 101. Each output port is accessible from an exterior of the housing 101. Each optical adapter defines at least one internal port accessible from an interior of the housing 101. The housing 101 defines at least one output port configured to receive a single-fiber optical connector and at least one output port configured to receive a multi-fiber optical connector. In the example shown, the indexing terminal housing 101 defines nine single-fiber output ports 104, 105 and three multi-fiber output ports 106, 108.

As used herein, the terms "input" and "output" are not intended to indicate a direction in which all optical signals pass through the network. Rather, the terms "input" and "output" are used for convenience. Optical signals pass back and forth over optical lines between a central office and subscribers in an optical network. In certain examples, one or more of the optical lines extend between two central offices or the same central office. Accordingly, optical signals pass over the input cable 102 both towards and away from the subscribers and central office(s). For the purposes of this disclosure, the subscribers are considered to be downstream of a first central office in the optical network.

The indexing terminal arrangement 100 indexes optical lines between the input cable 102 and the output ports. For example, the input cable 102 includes a plurality of optical fibers that each define part of one optical line. A first of the optical fibers of the input cable 102 is optically coupled to the single-fiber output port to provide a first optical line to the single-fiber output port. Others of the optical fibers of the input cable 102 are optically coupled to the multi-fiber output port, which defines a sequence of positions. The positions at the multi-fiber output port are filled in sequence so that optical lines are provided from the input cable 102 to at least the first position.

Figure 2:
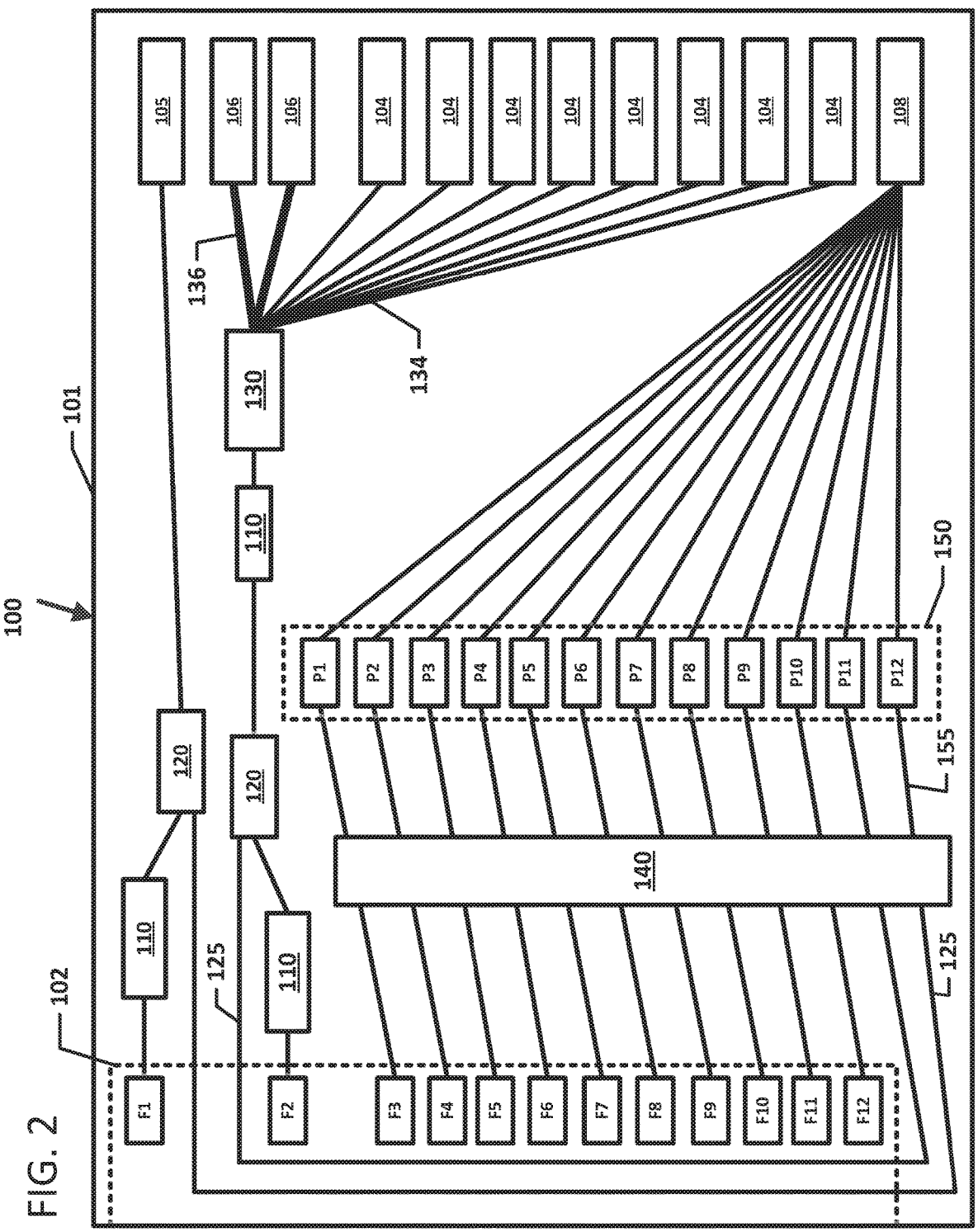
FIG. 2 is a block schematic diagram of the internal cabling of the indexing terminal arrangement of FIG. 1.

FIG. 2 is a block schematic diagram illustrating internal cabling of the indexing terminal arrangement 100. The indexing terminal housing 101 receives an input cable 102 having a plurality of optical fibers. In an example, the input cable 102 has twelve optical fibers F1-F12. In other examples, the input cable 102 may have any desired number of fibers (e.g., four, six, eight, ten, etc.).

A first optical fiber F1 of the input cable 102 is optically coupled to a first single-fiber output port 105. In some implementations, the first optical fiber F1 has a connectorized end that is plugged into an interior port of the first single-fiber output port 105. In other implementations, the first optical fiber F1 can be spliced (e.g., at a splice location 110) to a stub fiber connected at the first single-fiber output port 105. In still other implementations, the first optical fiber F1 can be optically coupled to a first optical coupler 120 (e.g., an optical power splitter) as will be described in more detail herein. For example, the first optical fiber F1 can be optically spliced (e.g., fusion spliced, mechanically spliced, etc.) to a first coupler input/output fiber of the first optical coupler 120 at a splice location 110. The first optical coupler 120 includes a second input/output fiber that is routed to the first single-fiber output port 105.

A second optical fiber F2 of the input cable 102 is optically coupled to an optical power splitter 130, which splits any optical signals carried by the second optical fiber F2 onto a plurality of splitter pigtails 134. In some implementations, one or more of the splitter pigtails 134 is routed to separate single-fiber output ports 104. For example, the one or more splitter pigtails 134 may each have a connectorized end that plugs into the interior port of the respective single-fiber output port 104. Accordingly, any optical signals carried by the second optical fiber will be carried over any optical fiber cables plugged into any of the single-fiber output ports 104.

In some implementations, all of the splitter pigtails are routed to separate single-fiber output ports 104. In other implementations, at least some of the splitter pigtails 134 are routed to a multi-fiber output port 106. In certain examples, multiple splitter pigtails 134 are commonly connectorized at a multi-fiber connector (e.g., an MPO connector) that is plugged into an interior port of a multi-fiber adapter that defines the multi-fiber output port 106. In certain implementations, the housing 101 holds a plurality of multi-fiber adapters that each define a multi-fiber output port 106. In the example shown, the housing 101 has two multi-fiber output ports 106. Some of the splitter pigtails 134 are routed to a first of the multi-fiber output ports 106, others of the splitter pigtails 134 are routed to a second of the multi-fiber output ports 106, and still others of the splitter pigtails 134 are routed to separate single-fiber output ports 104.

In some implementations, the optical power splitter 130 has a 1×32 split so that optical signals carried by the second optical fiber F2 are split into thirty-two splitter pigtails. In the example shown, twelve of the splitter pigtails 134 are routed to the first multi-fiber output port 106, another twelve of the splitter pigtails 134 are routed to the second multi-fiber output port 106, and the remaining eight splitter pigtails 134 are routed to separate single-fiber output ports 104. In other implementations, the optical power splitter 130 has a 1×16 split, 1×24 split, 1×48 split, 1×56 split, 1×64 split, 1×72 split, 1×96 split, 1×128 split, or another desired split and an appropriate number of splitter pigtails 134 are routed to each port 104, 106.

In some implementations, the second optical fiber F2 has a connectorized end that is plugged into an input port of the optical power splitter 130. In other implementations, the second optical fiber F2 can be spliced (e.g., at a splice location 110) to a splitter input fiber. In still other implementations, the second optical fiber F2 can be optically coupled to a second optical coupler 120 (e.g., an optical power splitter) as will be described in more detail herein. For example, the second optical fiber F2 can be optically spliced (e.g., fusion spliced, mechanically spliced, etc.) to a first coupler input/output fiber of the second optical coupler 120 at a splice location 110. The splitter input fiber is also coupled to the second coupler 120 (or a second coupler input/output fiber is routed to the optical splitter 130).

The third optical fiber F3 through twelfth optical fiber F12 of the input cable 102 are optically coupled to another multi-fiber output port 108 (i.e., a pass-through port). In some implementations, the third optical fiber F3 through twelfth optical fiber F12 are connectorized at a multi-fiber connector 150 (e.g., an MPO connector) that is plugged into an interior port of a pass-through multi-fiber optical adapter, which defines the pass-through port 108. In other implementations, the third optical fiber F3 through twelfth optical fiber F12 are optically spliced to stub fibers 155 of the multi-fiber connector 150. For example, the third optical fiber F3 through twelfth optical fiber F12 may be spliced to the stub fibers 155 at a mass fusion splice 140.

In some implementations, the multi-fiber connector 150 defines a plurality of fiber positions. In certain examples, the number of fiber positions of the multi-fiber connector 150 corresponds with the number of fibers of the input cable 120. In the example shown, the multi-fiber connector 150 defines twelve fiber positions P1-P12. However, the positions P1-P12 do not correspond with the optical fibers F1-F12 of the input cable 102. As noted above, the first and second optical fibers F1, F2 of the input cable 102 are routed to other output ports 104-106. Instead, the optical fibers F3-F12 of the input cable 102 are indexed in a first direction so that the third optical fiber F3 is routed to the first fiber position P1 of the connector 150. Subsequent fibers F4-F12 are routed to the next available position in the sequence.

The last two fiber positions P11, P12 in the sequence do not receive optical fibers of the input cable 102. Rather, in some implementations, these fiber positions P11, P12 receive dead fibers (i.e., are not connected to optical signal carrying lines that connect to the first central office). In other implementations, a respective coupler input/output fiber 125 extends between one of the optical couplers 120 and one of the last two fiber positions P11, P12. Accordingly, each coupler 120 receives an optical line from the first central office (via the input cable optical fiber F1, F2) and receives an optical line from the second central office (via the output port 108, multi-fiber connector 150, and input/output fiber 125). Thus, optical signals from either central office can be provided to any of the other output ports 104-106.

In some implementations, each of the single-fiber optical adapters 104, 105 is a hardened optical adapter. In an example, the exterior port of each of the single-fiber optical adapters 104, 105 is configured to receive a DLX connector. In some implementations, each of the multi-fiber optical adapters 106, 108 is a hardened optical adapter. In an example, the exterior port of each of the multi-fiber optical adapters 106, 108 is configured to receive an HMFOC connector.

Figure 3:
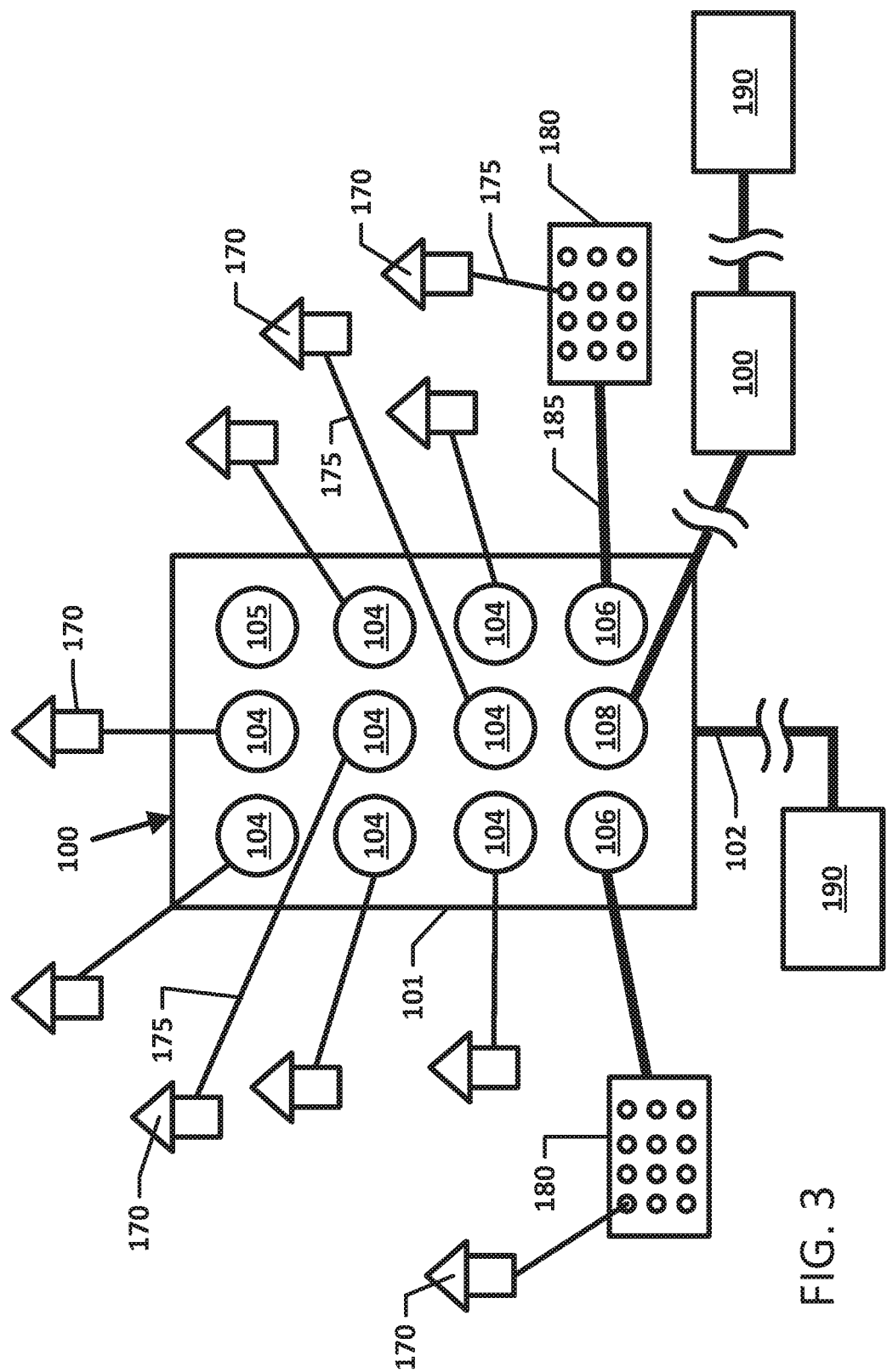
FIG. 3 is a block diagram showing a portion of an example optical network including the indexing terminal arrangement of FIG. 1.

FIG. 3 illustrates a portion of an optical fiber network including the indexing terminal arrangement 100. The input cable 120 is optically coupled to a central office 190 upstream in the optical network. Another multi-fiber cable can be received at the pass-through port 108 and routed to downstream portions of the optical network. In an example, the pass-through multi-fiber cable can be routed from the pass-through port 108 to another indexing terminal arrangement 100 in the network. In another example, the pass-through multi-fiber cable can be routed from the pass-through port 108 to a central office 190. In still other examples, the pass-through multi-fiber cable can be routed to other equipment in the network before reaching the central office 190 or other indexing terminal arrangement 100.

Single-fiber subscriber cables 175 are routed from the single-fiber output ports 104 to subscriber locations 170. Multi-fiber distribution cables 185 are routed from the multi-fiber output ports 106 to multi-service terminals 180, which define multiple output ports. One or more fibers of the multi-fiber distribution cables 185 are optically coupled to single-fiber output ports of the multi-service terminals. Single-fiber subscriber cables 175 can be routed from the single-fiber ports of the multi-service terminals to the subscribers 170. In certain implementations, one or more of the multi-service terminals 180 can include an optical splitter, an optical splice tray, and optical fiber management disposed within the interior of the multi-service terminal 180.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An indexing terminal comprising:
   a terminal housing having an input;
   a multi-fiber pass-through port coupled to the terminal housing;
   a plurality of optical lines indexed between the input and the multi-fiber pass-through port;
   a single-fiber output port coupled to the terminal housing;
   an optical power splitter disposed within the terminal housing;
   a first drop optical line bypassing the optical power splitter as the first drop optical line extends between the input and the single-fiber output port; and
   a second drop optical line extending between the input and the optical power splitter so that the optical power splitter splits optical signals carried over the second drop optical line onto a plurality of splitter pigtails.

2. The indexing terminal of claim 1, wherein the input of the terminal housing includes a sealed opening through which an input cable extends, the input cable including a plurality of optical fibers including a first optical fiber that defines at least part of the first drop optical line and a second optical fiber that defines at least part of the second drop optical line.

3. The indexing terminal of claim 2, wherein the first optical fiber extends fully between the input and the single-fiber output port.

4. The indexing terminal of claim 2, wherein the second optical fiber extends fully between the input and the optical power splitter.

5. The indexing terminal of claim 2, wherein at least some of the optical fibers of the input cable are spliced to interior optical fibers disposed within the terminal housing.

6. The indexing terminal of claim 5, wherein the optical fibers of the input cable are spliced at a mass fusion splice.

7. The indexing terminal of claim 1, wherein the input of the terminal housing includes a multi-fiber optical adapter coupled to the terminal housing so that an exterior port of the multi-fiber optical adapter is accessible from an exterior of the terminal housing.

8. The indexing terminal of claim 7, wherein the exterior port is configured to sealingly and robustly receive a connectorized end of an input cable.

9. The indexing terminal of claim 7, wherein a first optical fiber of the first drop optical line extends fully between the input and the single-fiber output port.

10. The indexing terminal of claim 7, wherein a second optical fiber of the second drop optical line extends fully between the input and the optical power splitter.

11. The indexing terminal of claim 1, wherein the first drop optical line includes an optical fiber routed from the input to the single-fiber output port.

12. The indexing terminal of claim 1, wherein the first drop optical line includes an optical fiber routed from the input to an optical coupler and another optical fiber routed from the optical coupler to the single-fiber output port.

13. The indexing terminal of claim 1, wherein the splitter pigtails are routed to separate single-fiber output ports.

14. The indexing terminal of claim 1, wherein at least some of the splitter pigtails are routed to a multi-fiber output port.

15. The indexing terminal of claim 14, wherein the multi-fiber output port is a first multi-fiber output port; and wherein a first set of the splitter pigtails are routed to the first multi-fiber output port and a second set of the splitter pigtails are routed to the second multi-fiber output port.

16. The indexing terminal of claim 14, wherein others of the splitter pigtails are routed to separate single-fiber output ports.

17. The indexing terminal of claim 1, wherein an optical line extends between the multi-fiber pass-through port and the single-fiber output port.

18. An indexing terminal comprising:
    a terminal housing carrying a multi-fiber pass-through port, a single-fiber output port, and a split signal output port; and
    an input cable extending into the terminal housing, the input cable defining a plurality of optical lines including a set of optical lines indexed at the multi-fiber pass-through port, a first drop line carrying unsplit optical signals to the single-fiber output port, and a second drop line carrying signals to an optical power splitter having a plurality of outputs, at least one of the outputs being accessible at the split signal output port.

19. The indexing terminal of claim 18, wherein the split signal output port is one of a plurality of single-fiber split signal output ports that each receive a connectorized end of one of the outputs of the optical power splitter.

20. The indexing terminal of claim 18, wherein the split signal output port is a multi-fiber output port receiving at least some of the outputs of the optical power splitter.

* * * * *